US012783169B2

(12) United States Patent
Li

(10) Patent No.: US 12,783,169 B2
(45) Date of Patent: Nov. 3, 2026

(54) TABLE ENTRY READING METHOD, NETWORK DEVICE, AND STORAGE MEDIUM

(71) Applicant: RUIJIE NETWORKS CO., LTD., Fuzhou (CN)

(72) Inventor: Yang Li, Fuzhou (CN)

(73) Assignee: RUIJIE NETWORKS CO., LTD., Fuzhou (CN)

( * ) Notice: Subject to any disclaimer, the term of this patent is extended or adjusted under 35 U.S.C. 154(b) by 264 days.

(21) Appl. No.: 18/431,046

(22) Filed: Feb. 2, 2024

(65) Prior Publication Data

US 2024/0302996 A1 Sep. 12, 2024

Related U.S. Application Data

(63) Continuation of application No. PCT/CN2023/085545, filed on Mar. 31, 2023.

(30) Foreign Application Priority Data

Apr. 2, 2022 (CN) ........................ 202210351147.X

(51) Int. Cl.
*G06F 12/00* (2006.01)
*G06F 3/06* (2006.01)

(52) U.S. Cl.
CPC .......... *G06F 3/0659* (2013.01); *G06F 3/0604* (2013.01); *G06F 3/0683* (2013.01)

(58) Field of Classification Search
CPC ............................. G06F 3/0613; G06F 3/0659
(Continued)

(56) References Cited

U.S. PATENT DOCUMENTS 7,975,109 B2 * 7/2011 McWilliams ....... G06F 12/0806 711/E12.066
11,762,559 B2 * 9/2023 Hatfield ................ G06F 3/0635 711/154

(Continued)

FOREIGN PATENT DOCUMENTS

CN 104410510 A 3/2015
CN 105868134 A 8/2016

(Continued)

OTHER PUBLICATIONS

International Search Report and Written Opinion dated Jun. 13, 2023 for International Application No. PCT/CN2023/085545.

(Continued)

*Primary Examiner* — Mohamed M Gebril

(57) ABSTRACT

This application provides a table entry reading method and apparatus, a network device, and a computer-readable storage medium. The method includes: when a read command is received from an interface module, determining a target controller from a plurality of controllers by polling according to a preset polling rule, and determining a correspondence between the interface module and the target controller; sending the read command to the target controller, so that the target controller obtains a table entry corresponding to the read command from a target memory corresponding to the target controller in a plurality of memories; and receiving the table entry returned by the target controller, and sending the table entry to the interface module based on the correspondence between the interface module and the target controller.

19 Claims, 9 Drawing Sheets

(58) Field of Classification Search
USPC ........................................................ 711/154
See application file for complete search history.

(56) References Cited

U.S. PATENT DOCUMENTS

| | | | | |
|---|---|---|---|---|
| 11,762,771 | B2 * | 9/2023 | Reina | G06F 12/0804 711/143 |
| 2010/0332743 | A1 * | 12/2010 | Zheng | H04L 45/60 711/E12.078 |
| 2013/0031330 | A1 * | 1/2013 | Jones | G06F 13/385 711/206 |
| 2015/0261446 | A1 * | 9/2015 | Lee | G06F 13/385 711/105 |
| 2016/0170916 | A1 | 6/2016 | Deshpande et al. | |
| 2017/0187921 | A1 * | 6/2017 | Su | G06F 21/31 |
| 2018/0089079 | A1 * | 3/2018 | Hansson | G06F 13/4234 |
| 2018/0150409 | A1 * | 5/2018 | Bacher | G06F 21/57 |
| 2019/0109789 | A1 * | 4/2019 | Friedman | H04L 69/22 |
| 2019/0280991 | A1 * | 9/2019 | Singh | H04L 47/24 |
| 2021/0190930 | A1 * | 6/2021 | Wang | G01S 13/765 |
| 2021/0390071 | A1 * | 12/2021 | Shen | G06F 13/4031 |
| 2022/0091784 | A1 | 3/2022 | Brandl | |
| 2022/0321499 | A1 * | 10/2022 | DiFerdinando | H04L 45/66 |
| 2023/0259304 | A1 * | 8/2023 | Hanna | G06F 3/0604 711/154 |

FOREIGN PATENT DOCUMENTS

| | | | |
|---|---|---|---|
| CN | 106164874 | A | 11/2016 |
| CN | 108776647 | A | 11/2018 |
| CN | 105868134 | B | 12/2018 |
| CN | 109408243 | A | 3/2019 |
| CN | 110058816 | A | 7/2019 |
| CN | 110058816 | B | 9/2020 |
| CN | 111949578 | A | 11/2020 |
| CN | 108776647 | B | 4/2021 |
| CN | 112703489 | A | 4/2021 |
| CN | 112948293 | A | 6/2021 |
| CN | 113867619 | A | 12/2021 |
| CN | 114880254 | A | 8/2022 |

OTHER PUBLICATIONS

First Office Action dated Apr. 12, 2025 for Chinese Application No. 202210351147.X.

Notification to Grant Patent Right for Invention for Chinese Patent Application No. 202210351147.X, dated Jul. 31, 2025.

* cited by examiner

TABLE ENTRY READING METHOD, NETWORK DEVICE, AND STORAGE MEDIUM

CROSS-REFERENCE TO RELATED APPLICATIONS

This application is a continuation of International Patent Application No. PCT/CN2023/085545 filed on Mar. 31, 2023, which claims priority to Chinese patent application No. 202210351147.X, filed with the China National Intellectual Property Administration on Apr. 2, 2022, and entitled "TABLE ENTRY READING METHOD AND APPARATUS, AND NETWORK DEVICE", both of which are incorporated herein by reference in their entireties.

TECHNICAL FIELD

This application relates to the field of communications technologies, and in particular, to a table entry reading method and apparatus, a network device, and a computer-readable storage medium.

BACKGROUND

With development of network technologies, routing table lookups for routers are facing a challenge of high reliability. A double data rate (Double Data Rate, DDR) synchronous dynamic random access memory (Synchronous Dynamic Random Access Memory, SDRAM) is characterized by a large capacity and low costs, and is usually used to store routing tables.

FIG. 1 is an architectural diagram of a solution in which a plurality of 100G interfaces access a DDR for table lookups in the related art. The architecture includes a table entry configuration module 101, a table lookup engine 102, six interface modules 103, six DDR controllers 104, and six DDR SDRAMs 105. It is known to persons skilled in the art that the interface modules may be ports used for communication, for example, Ethernet ports. The interface modules 103 and the DDR controllers 104 are connected to each other through DDR interfaces. A specific operating process is as follows: A central processing unit (English: Central Processing Unit, CPU for short) calls the table entry configuration module 101 to configure routing tables into the DDR SDRAMs 105. After receiving a packet, the table lookup engine 102 parses the packet to obtain a table entry storage address, and then triggers an interface module 103 corresponding to the storage address, and sends a read command to a DDR controller 104 corresponding to the interface module 103. After receiving the read command, the DDR controller 104 obtains a table entry from a DDR SDRAM 105 corresponding to the DDR controller 104, and returns the table entry to an interface module 103 corresponding to the DDR controller 104.

In the foregoing solution, the interface modules, the DDR controllers, and the DDR SDRAMs are in a one-to-one correspondence. If a DDR controller fails, a read command sent by a corresponding interface module cannot be processed, affecting table lookup access. In addition, bandwidth cannot be shared between DDR interfaces.

SUMMARY

Embodiments of this application provide a table entry reading method and apparatus, a network device, and a computer-readable storage medium.

According to a first aspect, an embodiment of this application provides a table entry reading method, where the table entry reading method is applied to a table entry reading device, and the table entry reading device includes a crossing module, a plurality of interface modules communicatively connected to the crossing module, a plurality of controllers communicatively connected to the crossing module, and a plurality of memories respectively corresponding to the plurality of controllers; where the plurality of interface modules include a first interface module, the plurality of controllers include a first controller, the plurality of memories include a first memory, and the first controller corresponds to the first memory; and the method includes:

- receiving a first read command sent by the first interface module;
- determining the first controller from the plurality of controllers as a target controller according to a preset polling rule, and recording a correspondence between the first interface module and the first controller;
- sending the first read command to the first controller, so that the first controller obtains, from the corresponding first memory, a first table entry corresponding to the first read command; and
- receiving the first table entry returned by the first controller, and sending the first table entry to the first interface module based on the correspondence between the first interface module and the first controller.

Based on the foregoing solution, because the interface modules, the controllers, and the memories can cross-transmit read commands and table entries, if a controller fails, other controllers may be used, so that reliability of table entry reading can be improved. In addition, because the interface modules, the controllers, and the memories are not in a one-to-one correspondence, interface bandwidth can be shared between the interface modules and the controllers, so that bandwidth utilization can be improved. This resolves a problem in the conventional technology that reliability is low and bandwidth utilization cannot be maximized during multi-interface DDR table lookup access.

In a possible implementation, the recording a correspondence between the first interface module and the first controller includes:

- adding a controller identifier for the first controller to a controller cache queue corresponding to the first interface module; and
- adding a module identifier for the first interface module to a module identifier cache queue corresponding to the first controller.

In a possible implementation, before the step of sending the first read command to the target controller, the method further includes:

- adding the first read command to a command cache queue corresponding to the first controller.

In a possible implementation, the plurality of interface modules further include a second interface module, and the method further includes:

- receiving a second read command sent by the second interface module;
- determining the first controller from the plurality of controllers as a target controller, and recording a correspondence between the second interface module and the first controller; and
- adding the second read command to a command cache queue corresponding to the first controller.

In a possible implementation, the command cache queue corresponding to the first controller includes a plurality of command cache sub-queues respectively corresponding to the plurality of interface modules, the first interface module corresponds to a first command cache sub-queue, and the second interface module corresponds to a second command cache sub-queue; and the adding the second read command to a command cache queue corresponding to the first controller includes:

adding the second read command to the second command cache sub-queue; and sending, to the first controller according to a load balancing principle, a read command in the plurality of command cache sub-queues of the command cache queue corresponding to the first controller.

In a possible implementation, the plurality of controllers further include a second controller, and the plurality of memories further include a second memory corresponding to the second controller; and the method further includes:

receiving a third read command sent by the first interface module;

determining the second controller from the plurality of controllers as the target controller according to a preset polling rule, and recording a correspondence between the first interface module and the second controller;

sending the third read command to the second controller, so that the second controller obtains, from the corresponding second memory, a third table entry corresponding to the third read command; and receiving the third table entry returned by the second controller, and adding the third table entry to a table entry storage queue.

In a possible implementation, the table entry storage queue includes a first table entry storage sub-queue and a second table entry storage sub-queue, the first table entry storage sub-queue corresponds to the first interface module, and the second table entry storage sub-queue corresponds to the second interface module;

the method further includes:

adding the first table entry to the first table entry storage sub-queue; and the adding the third table entry to a table entry storage queue includes:

adding the third table entry to the first table entry storage sub-queue.

In a possible implementation, the method further includes:

sending a table entry stored in the first table entry storage sub-queue to the first interface module, where during the sending, the crossing module is configured to perform sending in an order in which the first interface module establishes correspondences with controllers.

In a possible implementation, the determining the first controller from the plurality of controllers as a target controller according to a preset polling rule includes:

determining the first controller as a candidate controller according to the preset polling rule; and determining the first controller as the target controller when it is determined that state information of the first controller is an available state.

In a possible implementation, the determining the first controller from the plurality of controllers as a target controller according to a preset polling rule further includes:

determining the second controller as a candidate controller according to the preset polling rule; and determining the first controller as the candidate controller when it is determined that state information of the second controller is an unavailable state.

In a possible implementation, the preset polling rule is:

determining, as a candidate controller, a controller after a target controller determined in previous polling.

In a possible implementation, when the first controller is in a busy state and/or an abnormal state, state information of the first controller is an unavailable state; and/or when the first controller is in a non-busy state and/or a non-abnormal state, state information of the first controller is an available state.

In a possible implementation, the method in the foregoing embodiment is applied to a crossing module included in a table entry reading device of a network device, the table entry reading device further includes at least two interface modules, at least two controllers, and a memory corresponding to each controller, and the method includes:

after a read command sent by any one of the at least two interface modules is received, determining a target controller according to a preset polling rule and based on state information of a command cache sub-queue that is in a command cache queue of each controller and that corresponds to the any interface module, adding a controller identifier for the target controller to a controller identifier cache queue corresponding to the any interface module, and adding the read command to a command cache sub-queue that is in a command cache queue of the target controller and that corresponds to the any interface module;

sending, to a corresponding controller according to a load balancing principle, a read command in each command cache sub-queue included in each command cache queue of each controller, and adding a module identifier for an interface module corresponding to a command cache sub-queue in which the sent read command is located to a module identifier cache queue of a controller corresponding to the sent read command, so that each controller obtains, from a corresponding memory, a table entry corresponding to the received read command;

after a table entry returned by any one of the at least two controllers is received, first obtains a previously stored target module identifier from a module identifier cache queue corresponding to the any controller, and adds the received table entry to a table entry cache sub-queue that is in a table entry cache queue of an interface module corresponding to the target module identifier and that corresponds to the any controller; and according to an order in which controller identifiers in a controller identifier cache queue corresponding to each interface module are added, sending, to a corresponding interface module, a table entry in a table entry cache sub-queue that is in each table entry cache queue of each interface module and that corresponds to each controller. In a possible implementation, the determining a target controller according to a preset polling rule and based on state information of a command cache sub-queue that is in a command cache queue of each controller and that corresponds to the any interface module includes:

determining a candidate controller after a last determined target controller according to the preset polling rule;

determining state information of a command cache sub-queue that is in a command cache queue of the candidate controller and that corresponds to the any interface module; and if it is determined that the state information of the command cache sub-queue corresponding to the any interface module is a busy state, updating the candidate controller to a controller after the candidate controller, and performing the step of determining state information of a command cache sub-queue that is in a command cache queue of the candidate controller and that corresponds to the any interface module; or if it is determined that the state information of the command cache sub-queue corresponding to the any interface module is a non-busy state, determining the candidate controller as a target controller of this time.

Based on the foregoing solution, the candidate controller is determined according to the preset polling rule; then the state information of the command cache sub-queue that is in the command cache queue of the candidate controller and that corresponds to the any interface module is determined; and finally, the target controller is determined based on whether the state information is busy or non-busy. In this way, a non-busy controller is selected from the candidate controller as the target controller, so that efficiency of table entry reading can be improved.

In a possible implementation, the determining state information of a command cache sub-queue that is in a command cache queue of the candidate controller and that corresponds to the any interface module specifically includes:

obtaining a first quantity of read commands stored in the command cache sub-queue that is in the command cache queue of the candidate controller and that corresponds to the any interface module;

determining whether the first quantity is less than a first specified threshold; and if it is determined that the first quantity is less than the first specified threshold, determining that the state information of the command cache sub-queue corresponding to the any interface module is a non-busy state; or if it is determined that the first quantity is not less than the first specified threshold, determining that the state information of the command cache sub-queue corresponding to the any interface module is a busy state.

Based on the foregoing solution, a quantity of read commands stored in the command cache sub-queue that is in the command cache queue of the candidate controller and that corresponds to the any interface module is compared with the first specified threshold, and whether the state information of the command cache sub-queue is the non-busy state or the busy state is determined based on a comparison result. Because the first specified threshold is preset, the state information of the command cache sub-queue can be set flexibly.

In a possible implementation, before the determining the candidate controller as a target controller of this time, the method further includes:

determining state information of the candidate controller; and if it is determined that the state information of the candidate controller is abnormal, updating the candidate controller to a controller after the candidate controller, and performing the step of determining state information of the candidate controller; or if it is determined that the state information of the candidate controller is normal, performing the step of determining the candidate controller as a target controller of this time.

Based on the foregoing solution, before the candidate controller is determined as the target controller of this time, the target controller is determined based on whether the state information of the candidate controller is abnormal or normal, to avoid using an abnormal alternative controller as the target controller. This makes the determined target controller more accurate, and improves reliability of table entry reading.

In a possible implementation, the determining state information of the candidate controller specifically includes:

obtaining error information that is obtained by verifying an obtained table entry and that is sent by the candidate controller;

determining whether a second quantity of the obtained error information is greater than a second specified threshold; and if it is determined that the second quantity is greater than the second specified threshold, determining that the state information of the candidate controller is abnormal; or if it is determined that the second quantity is not greater than the second specified threshold, determining that the state information of the candidate controller is normal.

Based on the foregoing solution, a quantity of the obtained error information that is obtained by verifying the obtained table entry and that is sent by the candidate controller is compared with the second specified threshold, and whether the candidate controller is normal or abnormal is determined based on a comparison result. Because the second specified threshold is preset, flexibility of determining the state information of the candidate controller can be improved.

In a possible implementation, the according to an order in which controller identifiers in a controller identifier cache queue corresponding to each interface module are added, sending, to a corresponding interface module, a table entry in a table entry cache sub-queue that is in each table entry cache queue of each interface module and that corresponds to each controller includes:

first obtaining a previously stored controller identifier from a controller identifier cache queue corresponding to each interface module; and first sending, to a corresponding interface module, a table entry stored in a table entry cache sub-queue that is in each table entry cache queue of each interface module and that corresponds to the previously stored controller identifier.

Based on the foregoing solution, a table entry stored in a table entry cache sub-queue that is in each table entry cache queue of each interface module and that corresponds to the previously stored controller identifier is first sent to a corresponding interface module. This can ensure ordered output of table entries, and improve reliability of table entry reading.

In a possible implementation, after the adding the table entry to a first table entry cache sub-queue that is in a table entry cache queue of an interface module corresponding to the target module identifier and that corresponds to the any controller, the method further includes:

deleting the target module identifier from the module identifier cache queue corresponding to the any controller; and after the sending, to a corresponding interface module, a table entry in a table entry cache sub-queue that is in each table entry cache queue of each interface module and that corresponds to each controller, the method further includes:

first deleting a previously stored controller identifier from a controller identifier cache queue corresponding to each interface module.

Based on the foregoing solution, a previously stored module identifier and a previously stored controller identifier are first deleted, to ensure ordered output of table entries next time, and improve reliability of table entry reading.

According to a second aspect, an embodiment of this application further provides a table entry reading apparatus, applied to a crossing module included in a table entry reading device of a network device, where the table entry reading device further includes at least two interface modules, at least two controllers, and a memory corresponding to each controller, and the table entry reading apparatus includes a command crossing unit and a data crossing unit.

The command crossing unit is configured to: after a read command sent by any one of the at least two interface modules is received, determine a target controller according to a preset polling rule and based on state information of a command cache sub-queue that is in a command cache queue of each controller and that corresponds to the any interface module, add a controller identifier for the target controller to a controller identifier cache queue corresponding to the any interface module, and add the read command to a command cache sub-queue that is in a command cache queue of the target controller and that corresponds to the any interface module; and send, to a corresponding controller according to a load balancing principle, a read command in each command cache sub-queue included in each command cache queue of each controller, and add a module identifier for an interface module corresponding to a command cache sub-queue in which the sent read command is located to a module identifier cache queue of a controller corresponding to the sent read command, so that each controller obtains, from a corresponding memory, a table entry corresponding to the received read command.

The data crossing unit is configured to: after a table entry returned by any one of the at least two controllers is received, first obtain a previously stored target module identifier from a module identifier cache queue corresponding to the any controller, and add the received table entry to a table entry cache sub-queue that is in a table entry cache queue of an interface module corresponding to the target module identifier and that corresponds to the any controller; and according to an order in which controller identifiers in a controller identifier cache queue corresponding to each interface module are added, send, to a corresponding interface module, a table entry in a table entry cache sub-queue that is in each table entry cache queue of each interface module and that corresponds to each controller.

In a possible implementation, the command crossing unit is specifically configured to:

determine a candidate controller after a last determined target controller according to the preset polling rule;

determine state information of a command cache sub-queue that is in a command cache queue of the candidate controller and that corresponds to the any interface module; and if it is determined that the state information of the command cache sub-queue corresponding to the any interface module is a busy state, update the candidate controller to a controller after the candidate controller, and perform the step of determining state information of a command cache sub-queue that is in a command cache queue of the candidate controller and that corresponds to the any interface module; or if it is determined that the state information of the command cache sub-queue corresponding to the any interface module is a non-busy state, determine the candidate controller as a target controller of this time.

In a possible implementation, the command crossing unit is specifically configured to:

obtain a first quantity of read commands stored in the command cache sub-queue that is in the command cache queue of the candidate controller and that corresponds to the any interface module;

determine whether the first quantity is less than a first specified threshold; and if it is determined that the first quantity is less than the first specified threshold, determine that the state information of the command cache sub-queue corresponding to the any interface module is a non-busy state; or if it is determined that the first quantity is not less than the first specified threshold, determine that the state information of the command cache sub-queue corresponding to the any interface module is a busy state.

In a possible implementation, before the determining the candidate controller as a target controller of this time, the command crossing unit is further configured to:

determine state information of the candidate controller; and if it is determined that the state information of the candidate controller is abnormal, update the candidate controller to a controller after the candidate controller, and perform the step of determining state information of the candidate controller; or if it is determined that the state information of the candidate controller is normal, perform the step of determining the candidate controller as a target controller of this time.

In a possible implementation, the command crossing unit is specifically configured to:

obtain error information that is obtained by verifying an obtained table entry and that is sent by the candidate controller;

determine whether a second quantity of the obtained error information is greater than a second specified threshold; and if it is determined that the second quantity is greater than the second specified threshold, determine that the state information of the candidate controller is abnormal; or if it is determined that the second quantity is not greater than the second specified threshold, determine that the state information of the candidate controller is normal.

In a possible implementation, the data crossing unit is specifically configured to:

first obtain a previously stored controller identifier from a controller identifier cache queue corresponding to each interface module; and first send, to a corresponding interface module, a table entry stored in a table entry cache sub-queue that is in each table entry cache queue of each interface module and that corresponds to the previously stored controller identifier.

In a possible implementation, after the adding the received table entry to a table entry cache sub-queue that is in a table entry cache queue of an interface module corresponding to the target module identifier and that corresponds to the any controller, the data crossing unit is further configured to:

delete the target module identifier from the module identifier cache queue corresponding to the any controller; and after the sending, to a corresponding interface module, a table entry in a table entry cache sub-queue that is in each table entry cache queue of each interface module and that corresponds to each controller, the crossing module is further configured to:

first delete a previously stored controller identifier from a controller identifier cache queue corresponding to each interface module.

According to a third aspect, an embodiment of this application further provides a network device, including a table entry reading device, where the table entry reading device includes at least two interface modules, at least two controllers, a memory corresponding to each controller, and the table entry reading apparatus according to any one of the implementations of the second aspect.

According to a fourth aspect, an embodiment of this application further provides a computer-readable storage medium, where the computer-readable storage medium stores computer instructions, and when the computer instructions run on a computer, the computer is enabled to perform the method according to any one of the implementations of the first aspect.

For the aspects of the second aspect to the fourth aspect and technical effects that can be achieved in the aspects, refer to the descriptions of the technical effects that can be achieved in the first aspect or the possible solutions of the first aspect. Details are not repeated herein again.

BRIEF DESCRIPTION OF DRAWINGS

To describe the technical solutions in this application more clearly, the following briefly describes the accompanying drawings for describing the embodiments. Clearly, the accompanying drawings in the following descriptions show merely some embodiments of this application, and persons of ordinary skill in the art may still derive other drawings from these accompanying drawings without creative efforts.

DESCRIPTION OF EMBODIMENTS

To make the objectives, technical solutions, and advantages clearer, the following clearly and completely describes the technical solutions in the embodiments of this application with reference to the accompanying drawings. Clearly, the described embodiments are merely some but not all of the embodiments of this application. All other embodiments obtained by persons of ordinary skill in the art based on the embodiments of this application shall fall within the protection scope of this application.

Figure 1:
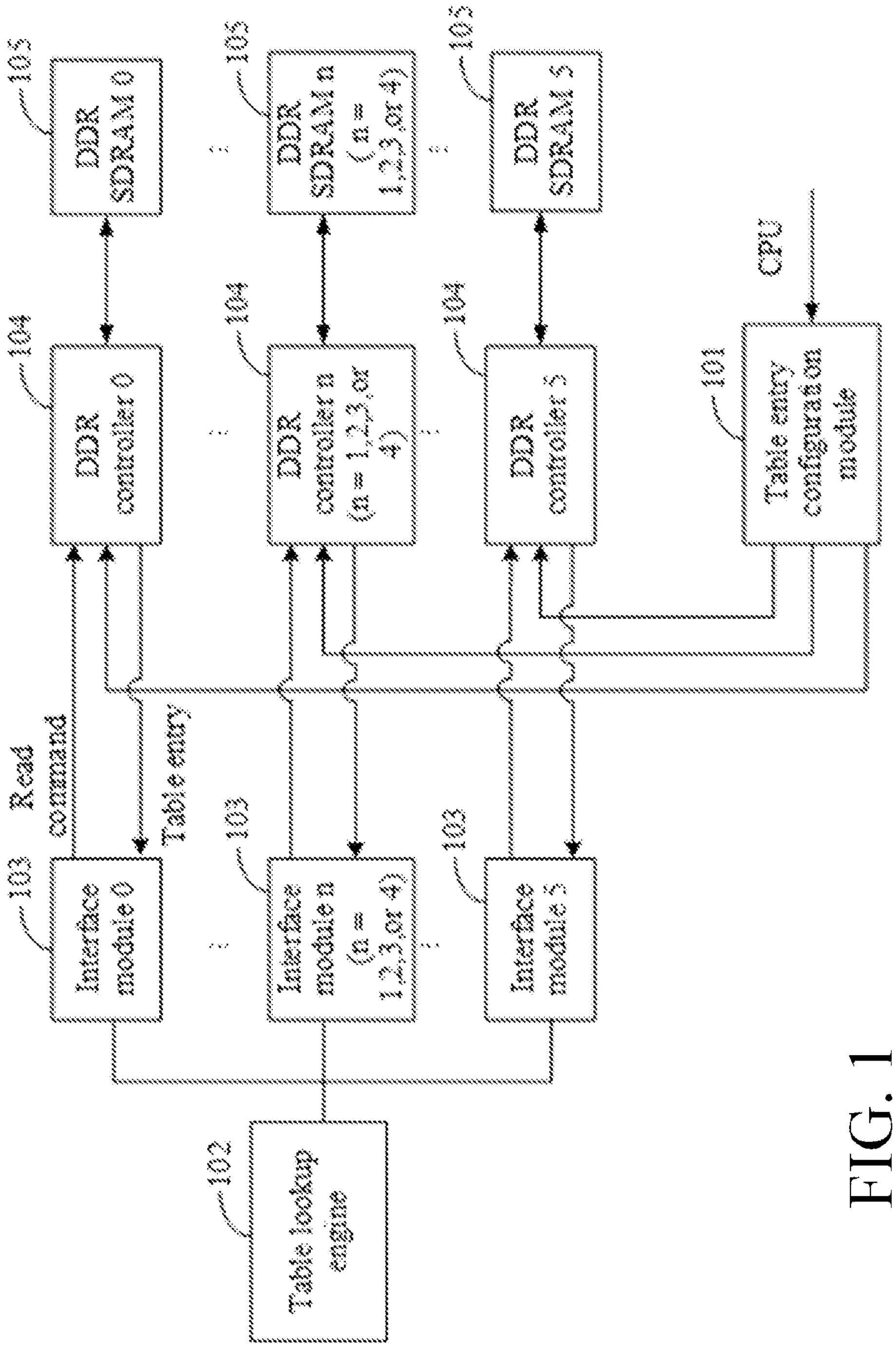
FIG. 1 (Prior Art)
FIG. 1 is an architectural diagram of a solution in which a plurality of 100G interfaces access a DDR for table lookups in the related art.
Figure 2:
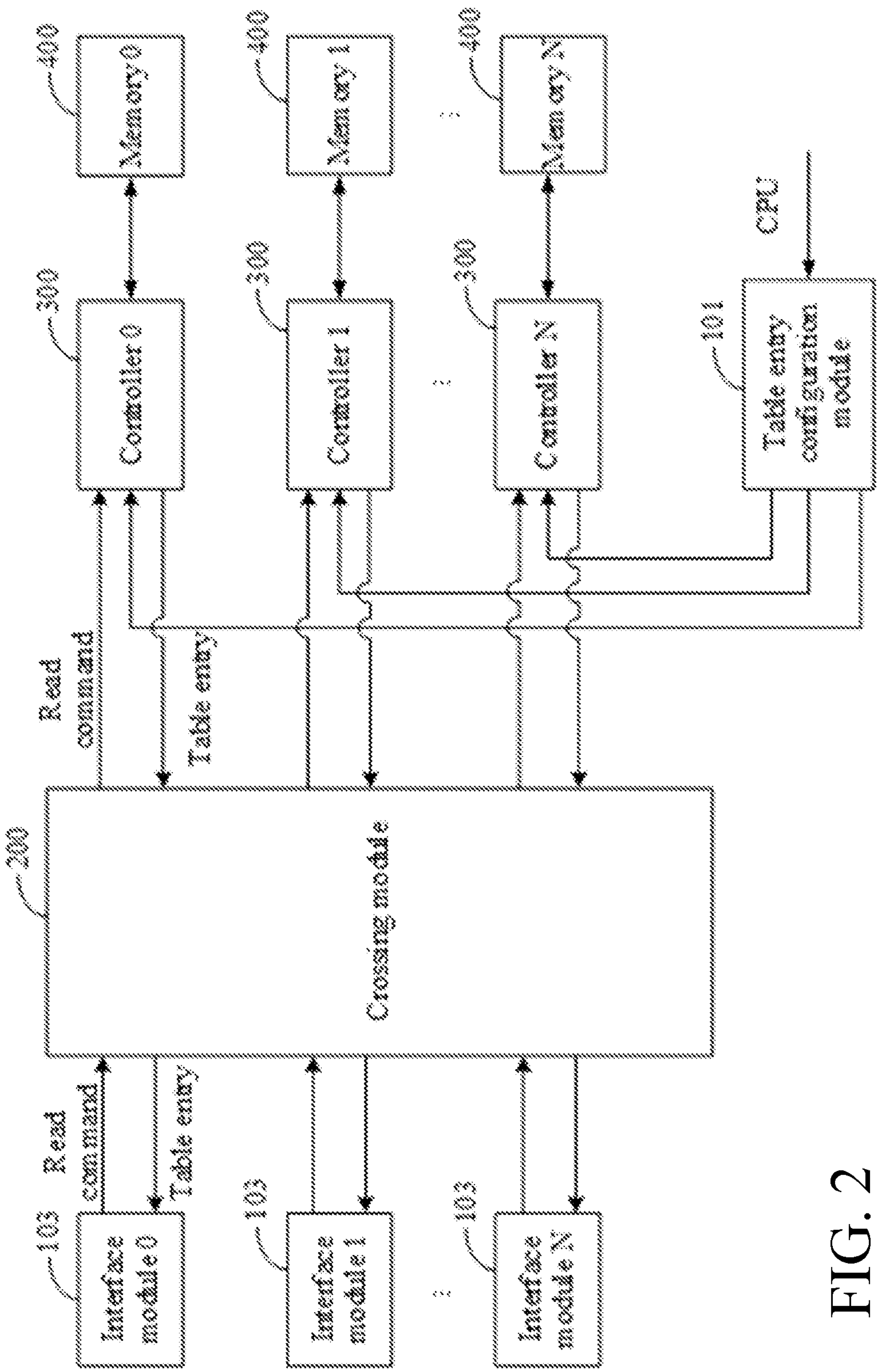
FIG. 2 is a schematic diagram of a table entry reading architecture according to an embodiment of this application.
Figure 3:
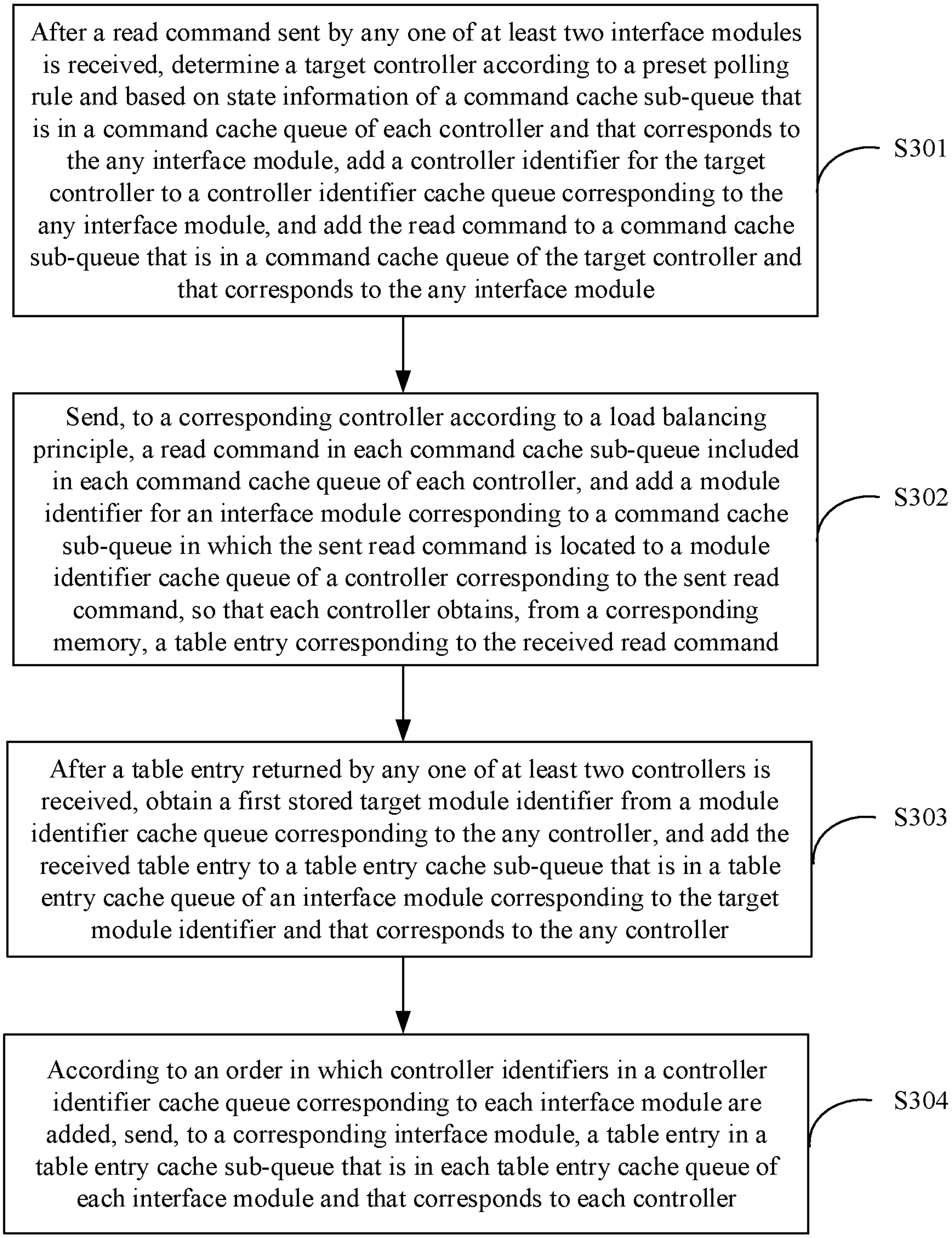
FIG. 3 is a schematic flowchart of a table entry reading method according to an embodiment of this application.
Figure 4:
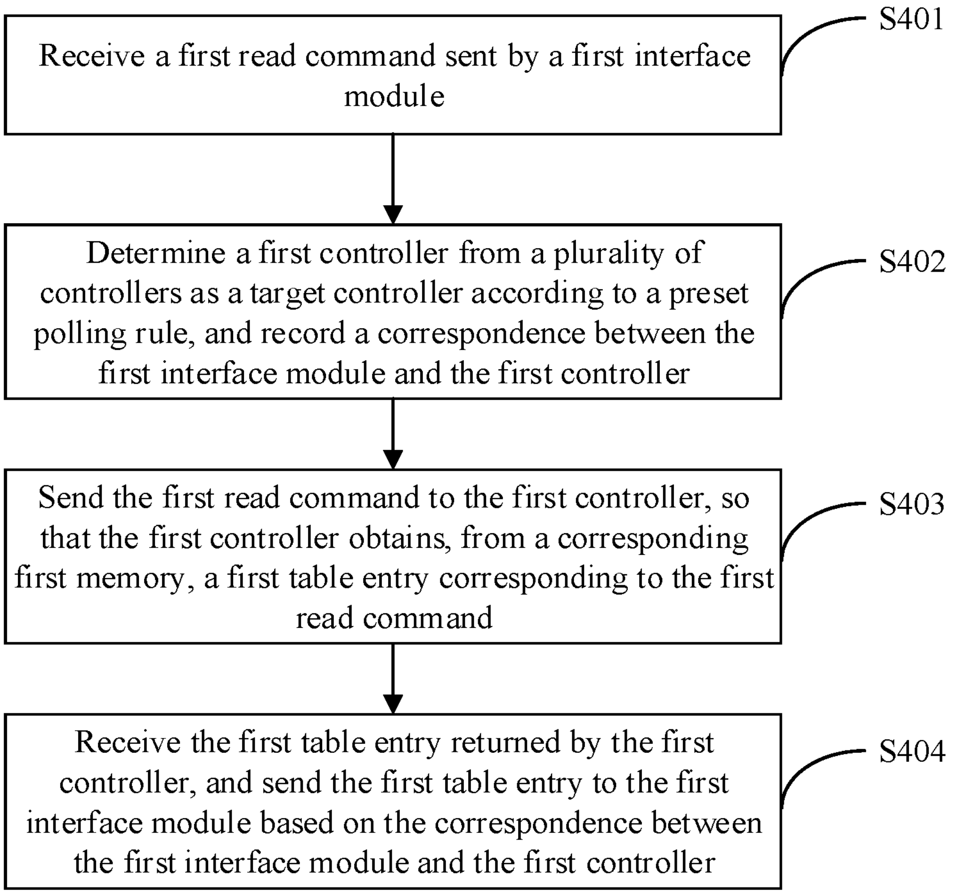
FIG. 4 is a schematic flowchart of another table entry reading method according to an embodiment of this application.

To improve reliability of table entry reading and improve utilization of interface bandwidth, an embodiment of this application provides a table entry reading method, applied to a crossing module 200 included in a table entry reading device of a network device. As shown in FIG. 2, the table entry reading device further includes at least two interface modules 103, at least two controllers 300, and a memory 400 corresponding to each controller. As shown in FIG. 3, the method includes the following steps.

S301: After a read command sent by any one of at least two interface modules is received, determine a target controller according to a preset polling rule and based on state information of a command cache sub-queue that is in a command cache queue of each controller and that corresponds to the any interface module, add a controller identifier for the target controller to a controller identifier cache queue corresponding to the any interface module, and add the read command to a command cache sub-queue that is in a command cache queue of the target controller and that corresponds to the any interface module. The command cache sub-queue is added. Even if a current controller is in an operating state, a read command can still be allocated to the controller, to improve processing efficiency of a processor.

S302: Send, to a corresponding controller according to a load balancing principle, a read command in each command cache sub-queue included in each command cache queue of each controller, and add a module identifier for an interface module corresponding to a command cache sub-queue in which the sent read command is located to a module identifier cache queue of a controller corresponding to the sent read command, so that each controller obtains, from a corresponding memory, a table entry corresponding to the received read command.

S303: After a table entry returned by any one of the at least two controllers is received, first obtain a previously stored target module identifier from a module identifier cache queue corresponding to the any controller, and add the received table entry to a table entry cache sub-queue that is in a table entry cache queue of an interface module corresponding to the target module identifier and that corresponds to the any controller. The table entry cache queue is set. Even if an interface module is busy, a read table entry can be stored, so that a controller can continue to process a next read command, and reading efficiency is improved. In addition, table entries belonging to one interface module may be cached in one table entry cache queue, to simplify logic of subsequent sending.

S304: According to an order in which controller identifiers in a controller identifier cache queue corresponding to each interface module are added, send, to a corresponding interface module, a table entry in a table entry cache sub-queue that is in each table entry cache queue of each interface module and that corresponds to each controller. Table entries in a table entry cache sub-queue are sent according to an order in which controller identifiers in a controller identifier cache queue are added. In this way, table entries received by each interface module can be consistent with an order in which read commands are sent, to ensure that each interface module receives table entries correctly in an ordered manner.

In the table entry reading method provided in this embodiment of this application, because the interface modules, the controllers, and the memories can cross-transmit read commands and table entries, if a controller fails, other controllers may be used, so that reliability of table entry reading can be improved. In addition, because the interface modules, the controllers, and the memories are not in a one-to-one correspondence, interface bandwidth can be shared between the interface modules and the controllers, so that bandwidth utilization can be improved.

In a specific implementation, the table entry reading device may be a field programmable logic gate array (English: Field Programmable Gate Array, FPGA for short) or another programmable device, and the crossing module in this embodiment of this application may be an FPGA, another programmable device, an application-specific integrated circuit (English: Application Specific Integrated Circuit, ASIC for short) chip, or the like. The controller in this embodiment of this application may be a DDR controller, the memory may be a DDR SDRAM, the crossing module may be a DDR crossing module, and the cache queue may be a first in first out (English: First Input First Output, FIFO for short) queue.

An embodiment of this application further provides a table entry reading method, where the method is applied to a table entry reading device, and the table entry reading device includes a crossing module, a plurality of interface modules communicatively connected to the crossing module, a plurality of controllers communicatively connected to the crossing module, and a plurality of memories respectively corresponding to the plurality of controllers; where the plurality of interface modules include a first interface module, the plurality of controllers include a first controller, the plurality of memories include a first memory, the first controller corresponds to the first memory, and the table entry reading method includes the following steps.

S401: Receive a first read command sent by the first interface module. It can be understood that the first interface module herein may be any one of the plurality of interface modules.

S402: Determine the first controller from the plurality of controllers as a target controller according to a preset polling rule, and determine a correspondence between the first interface module and the first controller. It can be understood that the first controller herein may be any one of the plurality of controllers that meets a condition, and the target controller herein corresponds to the first read command. It can also be understood that after the correspondence between the first interface module and the first controller is determined, the correspondence can be recorded.

S403: Send the first read command to the first controller, so that the first controller obtains, from the corresponding first memory, a first table entry corresponding to the first read command.

S404: Receive the first table entry returned by the first controller, and send the first table entry to the first interface module based on the correspondence between the first interface module and the first controller.

Figure 5:
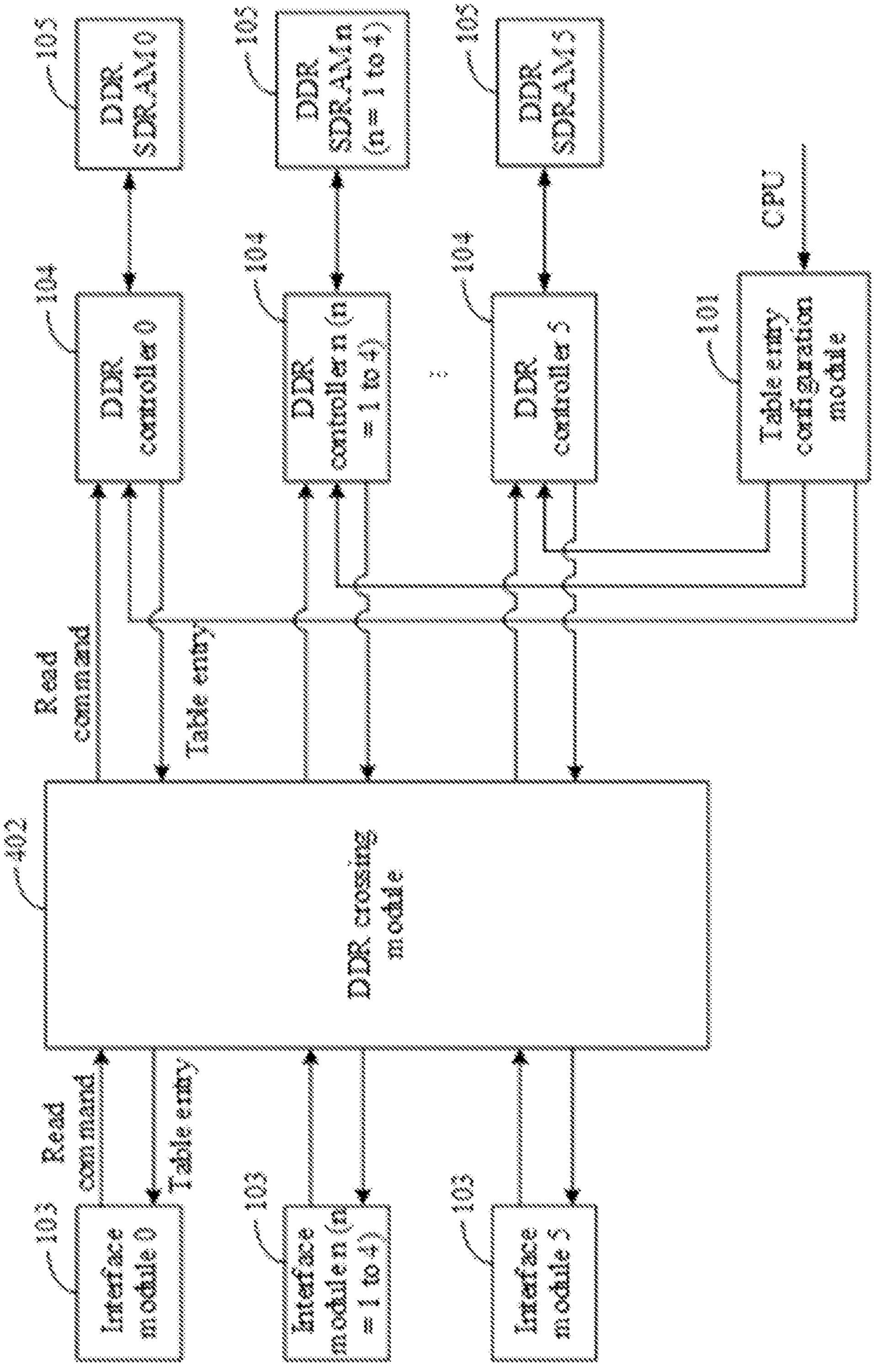
FIG. 5 is a schematic diagram of another table entry reading architecture according to an embodiment of this application.

This embodiment of this application is described below by using a DDR crossing module, a DDR controller, and a DDR SDRAM as examples, and by using an example in which a cache queue is FIFO and quantities of interface modules and controllers are both 6. FIG. 5 is a schematic diagram of a table entry reading architecture according to an embodiment of this application.

Based on the diagram of the table entry reading architecture shown in FIG. 5, before a table entry is read, to parse CPU configuration commands, a table entry configuration module configures table entries into six sets of DDR memories. Because content of table entries stored in the six sets of DDR memories is identical, the six sets of DDR memories can be randomly accessed in a shared manner. After receiving a read command sent by any one of six interface modules 103, a DDR crossing module 402 determines a target DDR controller according to a preset polling rule and based on state information of a command cache sub-queue that is in a command cache queue of each DDR controller 104 and that corresponds to any interface 401, adds a controller identifier for the target DDR controller 104 to a controller identifier cache queue corresponding to the any interface module 103, and adds the read command to a command cache sub-queue that is in a command cache queue of the target DDR controller 104 and that corresponds to the any interface module 103; sends, to a corresponding DDR controller 104 according to a load balancing principle, a read command in each command cache sub-queue included in each command cache queue of each DDR controller 104, and adds a module identifier for an interface module 103 corresponding to a command cache sub-queue in which the sent read command is located to a module identifier cache queue of a DDR controller 104 corresponding to the sent read command, so that each DDR controller obtains, from a corresponding DDR SDRAM 105, a table entry corresponding to a received read command; after a table entry returned by any one of six DDR controllers 104 is received, obtains a first stored target module identifier from a module identifier cache queue corresponding to the any DDR controller 104, and adds the received table entry to a table entry cache sub-queue that is in a table entry cache queue corresponding to an interface module corresponding to the target module identifier and that corresponds to the any DDR controller 104; and according to an order in which controller identifiers in a controller identifier cache queue corresponding to each interface module 103 are added, sends, to a corresponding interface module 103, a table entry in a table entry cache sub-queue that is in each table entry cache queue of each interface module 103 and that corresponds to each DDR controller 104.

It can be understood that, before a table entry is read, to parse CPU configuration commands, the table entry configuration module may configure table entries into a plurality of sets of DDR memories. In a possible implementation, table entries are configured into all DDR memories.

Figure 6:
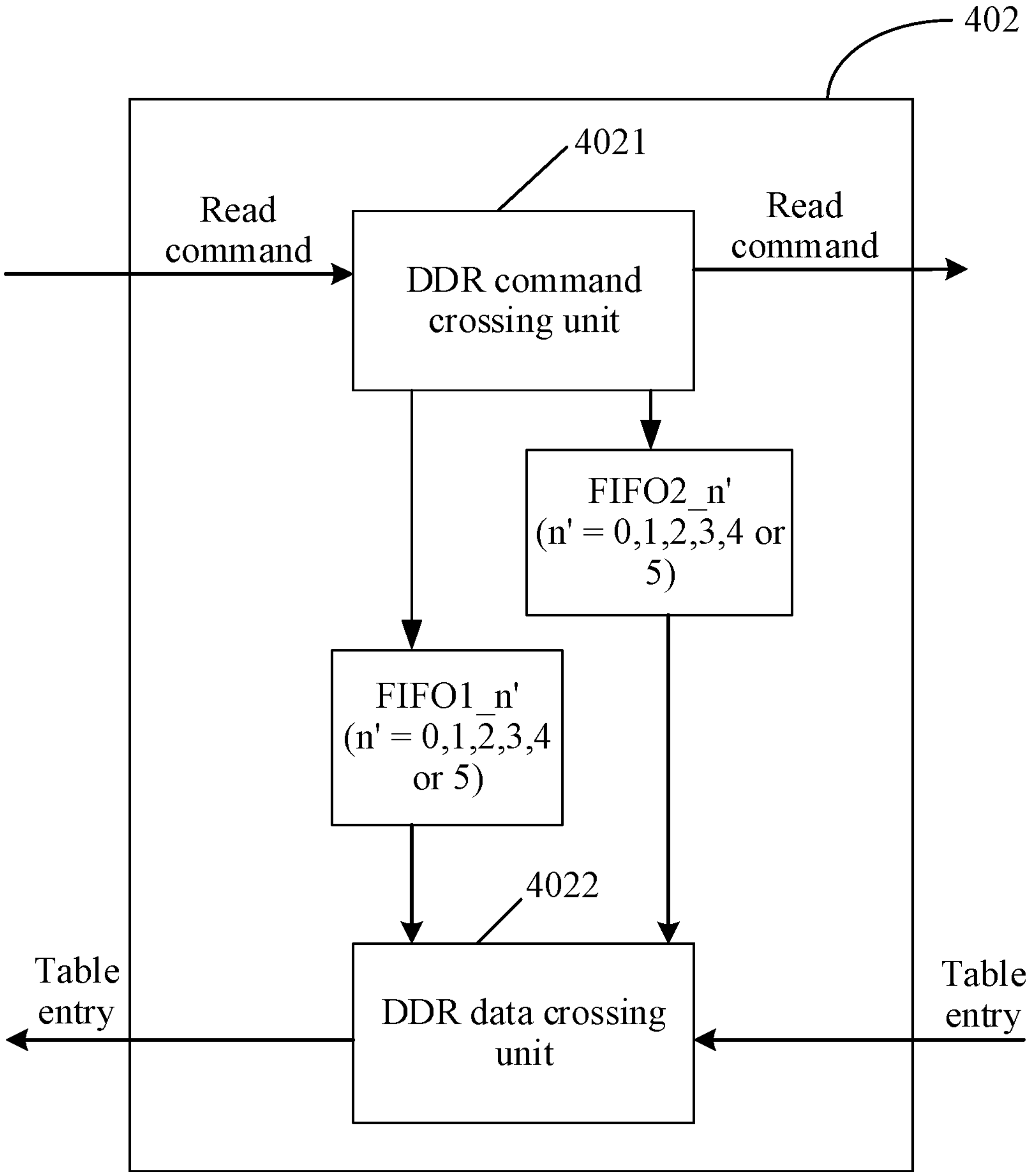
FIG. 6 is a schematic architectural diagram of a DDR crossing module according to an embodiment of this application.

FIG. 6 is a schematic architectural diagram of a DDR crossing module according to an embodiment of this application. It can be learned from FIG. 6 that, in a specific implementation, the DDR crossing module 402 may include a DDR command crossing unit 4021 and a DDR data crossing unit 4022. To implement correct and ordered output of read commands and returned table entries, FIFOs with two storage identifiers are required. FIFO1_*n'* is a controller identifier cache queue, is in a one-to-one correspondence with an interface module 103, and is used to store controller identifiers. FIFO2_*n'* is a module identifier cache queue, is in a one-to-one correspondence with a DDR controller, and is used to store a module identifier for the interface module 103, where n'=0, 1, 2, 3, 4, or 5.

In this embodiment of this application, each interface module corresponds to one module identifier. For example, a module identifier corresponding to an interface module 0 is 0, and a module identifier corresponding to an interface module 1 is 1. Each DDR controller corresponds to one controller identifier. For example, a controller identifier corresponding to a DDR controller 0 is 0, a controller identifier corresponding to a DDR controller 1 is 1, and a controller identifier corresponding to a DDR controller 2 is 2.

Figure 7:
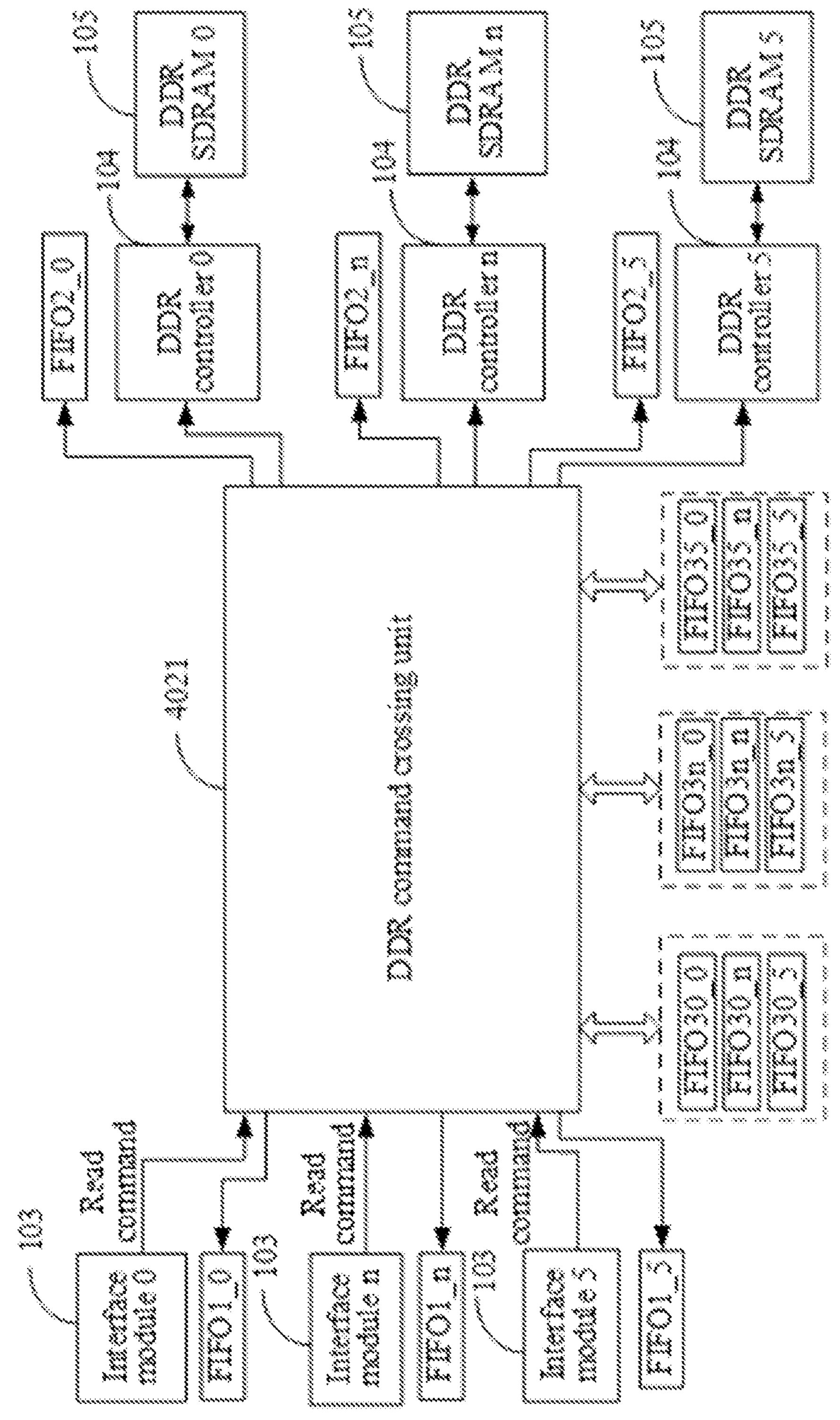
FIG. 7 is a schematic diagram of another table entry reading architecture according to an embodiment of this application.
Figure 8:
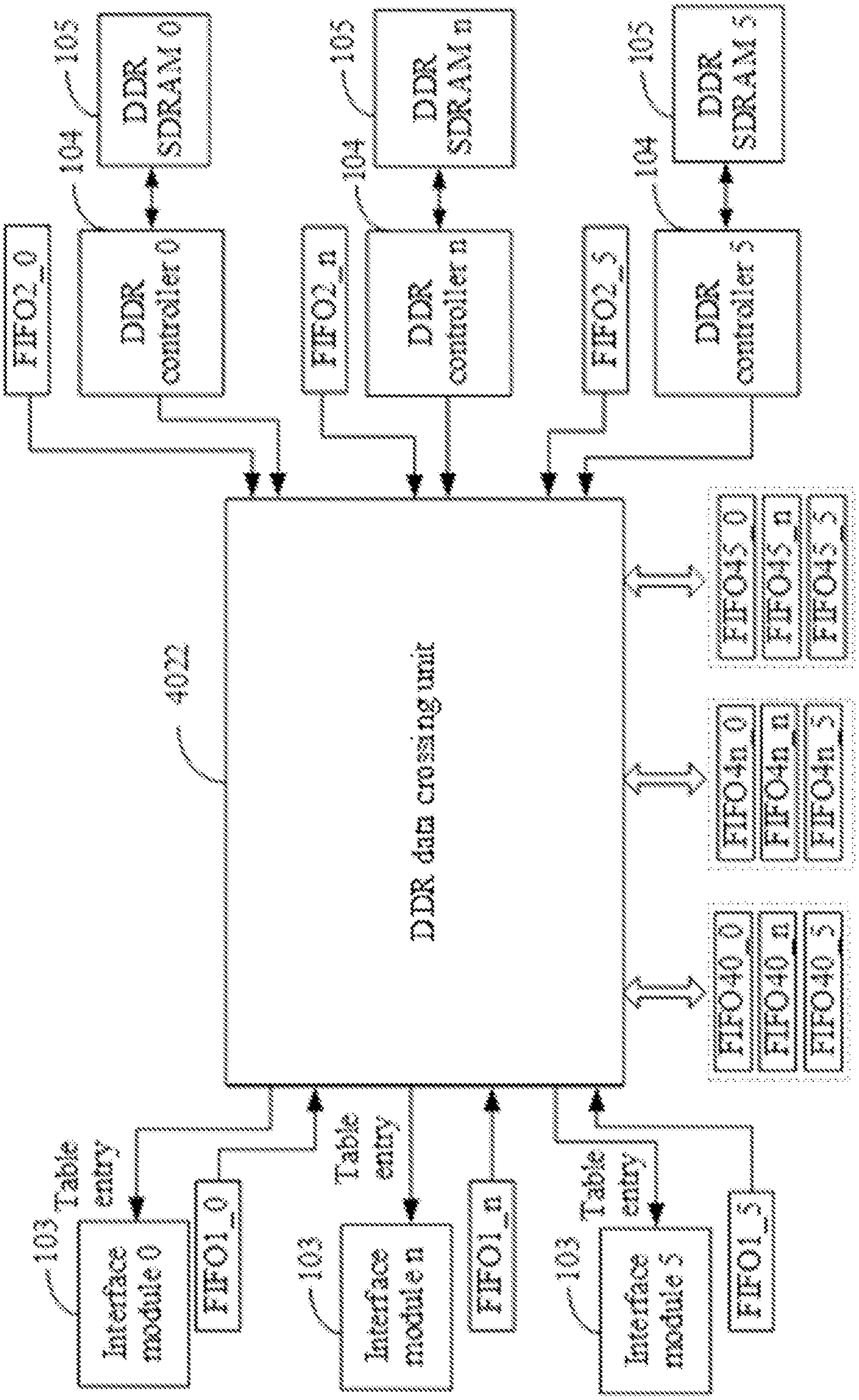
FIG. 8 is a schematic diagram of another table entry reading architecture according to an embodiment of this application.

As shown in FIG. 7 and FIG. 8, in this embodiment of this application, a FIFO3 and a FIFO4 are further included, in addition to the FIFO1 and the FIFO2.

The FIFO3 is a command cache queue, and each DDR controller corresponds to one command cache queue FIFO3. For example, a command cache queue corresponding to the DDR controller 0 is a FIFO30, and a command cache queue corresponding to the DDR controller 1 is a FIFO31. Each command cache queue includes a command cache sub-queue corresponding to an interface module. For example, the command cache queue FIFO30 corresponding to the DDR controller 0 includes a command cache sub-queue FIFO30_0 corresponding to the interface module 0, a command cache sub-queue FIFO30_1 corresponding to the interface module 1, a command cache sub-queue FIFO30_2 corresponding to an interface module 2, a command cache sub-queue FIFO30_3 corresponding to an interface module 3, a command cache sub-queue FIFO30_4 corresponding to an interface module 4, and a command cache sub-queue FIFO30_5 corresponding to an interface module 5.

The FIFO4 is a table entry cache queue, and each interface module corresponds to one table entry cache queue FIFO4. For example, a table entry cache queue corresponding to the interface module 0 is a FIFO40, and a table entry cache queue corresponding to the interface module 1 is a FIFO41. Each table entry cache queue includes a table entry cache sub-queue corresponding to a DDR controller. For example, the table entry cache queue FIFO40 corresponding to the interface module 0 includes a table entry cache sub-queue FIFO40_0 corresponding to the DDR controller 0, a table entry cache sub-queue FIFO40_1 corresponding to the DDR controller 1, a table entry cache sub-queue FIFO40_2 corresponding to the DDR controller 2, a table entry cache sub-queue FIFO40_3 corresponding to a DDR controller 3, a table entry cache sub-queue FIFO40_4 corresponding to a DDR controller 4, and a table entry cache sub-queue FIFO40_5 corresponding to a DDR controller 5.

The table entry reading method provided in the embodiments of this application is described in detail below with reference to FIG. 7 and FIG. 8.

The DDR command crossing unit 4021 receives a read command sent by any interface module 103. The DDR command crossing unit 4021 determines a target DDR controller according to a preset polling rule and based on state information of a command cache sub-queue that is in a command cache queue FIFO3 of each DDR controller 104 and that corresponds to the any interface module, adds a controller identifier for the target DDR controller to a controller identifier cache queue FIFO1 corresponding to the any interface module 103, and adds the read command to a command cache sub-queue that is in a command cache queue FIFO3 of the target DDR controller and that corresponds to the any interface module 103.

For example, as shown in FIG. 7, the interface module 0 sends a read command. After receiving the read command, the DDR command crossing unit 4021 determines that the target DDR controller is the DDR controller 1 according to the preset polling rule and based on state information of the command cache sub-queues FIFO30_0, FIFO31_0, FIFO32_0, FIFO33_0, FIFO34_0, and FIFO35_0, adds a controller identifier 1 of the DDR controller 1 to the FIFO1_0, and adds the received read command to the FIFO31_0.

In a specific implementation, the determining a target DDR controller may be: determining a candidate DDR controller after a last determined target DDR controller according to the preset polling rule; then determining state information of a command cache sub-queue that is in a command cache queue of the candidate DDR controller and that corresponds to any interface module; and if it is determined that the state information of the command cache sub-queue corresponding to the any interface module is busy, updating the candidate DDR controller to a DDR controller after the candidate DDR controller, and performing the step of determining state information of a command cache sub-queue that is in a command cache queue of the candidate DDR controller and that corresponds to the any interface module; or if it is determined that the state information of the command cache sub-queue corresponding to the any interface module is non-busy, determining the candidate DDR controller as a target DDR controller of this time.

For example, the preset polling rule is to sequentially performing polling based on controller identifiers of DDR controllers. With reference to FIG. 7, if a target DDR controller determined last time is the DDR controller 0, the DDR controller 1 is used as the candidate DDR controller. If the read command is sent by the interface module 0, state information of the command cache sub-queue FIFO31_0 is determined. If the state information of the FIFO31_0 is a non-busy state, the DDR controller 1 is used as the target DDR controller. If the state information of the FIFO31_0 is a busy state, the DDR controller 2 is used as the candidate DDR controller. The foregoing steps are repeated until the target DDR controller is determined.

Specifically, the determining state information of a command cache sub-queue may be: obtaining a first quantity of read commands stored in the command cache sub-queue that is in the command cache queue of the candidate DDR controller and that corresponds to the any interface module; determining whether the first quantity is less than a first specified threshold; and if the first quantity is less than the first specified threshold, determining that the state information of the command cache sub-queue corresponding to the any interface module is a non-busy state; or if the first quantity is not less than the first specified threshold, determining that the state information is a busy state.

For example, with reference to FIG. 7, if the interface module that sends the read command is the interface module 0, the candidate DDR controller is the DDR controller 1, and the first specified threshold is 5, an obtained quantity of read commands in the FIFO31_0 is 6 and is greater than the first specified threshold. In this case, it is determined that the FIFO31_0 is in a busy state.

In an implementation, during determining of the target DDR controller, in addition to state information of a command cache sub-queue that is in a command cache queue of a DDR controller and that corresponds to the interface module sending the read command, state information, that is, an abnormal or normal state, of the DDR controller further needs to be determined. The DDR controller can be used as the target DDR controller only if the state information of the DDR controller is the normal state.

Figure 9:
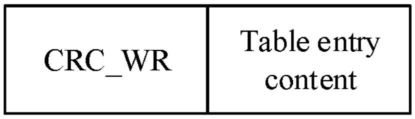
FIG. 9 is a schematic diagram of a format of a table entry according to an embodiment of this application.

Specifically, during table entry configuration, CRC is calculated based on content of a table entry, and is denoted as CRC_WR. The CRC_WR is placed in an unused most significant bit of the table entry. FIG. 9 shows a format of a table entry written into a DDR SDRAM.

When a table entry is returned, after obtaining the table entry, a DDR controller calculates table entry content of the table entry by using a same algorithm that is used to calculate the CRC_WR, to obtain CRC_RD. The DDR controller obtains the CRC_WR from the table entry, compares the CRC_WR with the CRC_RD. If the CRC_WR is the same as the CRC_RD, it is determined that the table entry returned this time is correct; otherwise, it is determined that the returned table entry is incorrect. If it is determined that the returned table entry is incorrect, one count is performed, and the count value may be sent to the DDR crossing module.

The DDR crossing module monitors the received count value; and if the count value is greater than a second specified threshold, determines that the state information of the DDR controller is abnormal; or if the count value is not greater than the second specified threshold, determines that the state information of the DDR controller is normal.

In a specific implementation, if the state information of the candidate DDR controller is normal, and the state information of the command cache sub-queue that is in the command cache queue and that corresponds to the interface module sending the read command is a non-busy state, the candidate DDR controller is used as the target DDR controller; or if the state information of the candidate DDR controller is abnormal, and the state information of the command cache sub-queue that is in the command cache queue and that corresponds to the interface module sending the read command is a non-busy state, the candidate DDR controller is updated to a DDR controller after the candidate DDR controller, and the step of determining state information of a command cache sub-queue that is in the command cache queue of the candidate DDR controller and that corresponds to the interface module sending the read command is performed.

For example, with reference to FIG. 7, the candidate DDR controller is the DDR controller 1, and the command cache sub-queue that is in the command cache queue and that corresponds to the interface module sending the read command is the FIFO31_0. If the DDR command crossing unit 4021 determines that state information of the DDR controller 1 is abnormal and state information of the FIFO31_0 is non-busy, the DDR controller 2 is used as the candidate DDR controller. Then state information of the DDR controller 2 and state information of the FIFO32_0 are determined. If the state information of the DDR controller 2 is normal and the state information of the FIFO32_0 is a non-busy state, the DDR controller 2 is used as the target DDR controller.

The DDR command crossing unit 4021 determines the target DDR controller, adds a controller identifier for the target DDR controller to a controller identifier cache queue FIFO1 corresponding to the interface module sending the read command, and adds the read command to a command cache sub-queue that is in a command cache queue FIFO3 of the target DDR controller and that corresponds to the interface module sending the read command; and sends, to a corresponding DDR controller according to a load balancing principle, a read command in each command cache sub-queue included in a command cache queue FIFO3 corresponding to each DDR controller, and adds a module identifier for an interface module corresponding to a command cache sub-queue in which the read command is located to a module identifier cache queue FIFO2 of a controller corresponding to the sent read command, so that each DDR controller obtains, from a corresponding DDR SDRAM, a table entry corresponding to a received read command.

With reference to FIG. 7, for example, the command cache sub-queue FIFO30_4 stores the most read commands. In this case, a read command first stored in the command cache sub-queue FIFO30_4 is output to the DDR controller 0, a module identifier 4 is stored in the FIFO2_0, and the DDR controller 0 obtains a table entry from the DDR SDRAM 0.

The processes of sending a read command, obtaining a table entry, storing a controller identifier, and storing a module identifier are described above, and the following describes how to send a table entry to an interface module.

As shown in FIG. 8, after receiving a table entry sent by any DDR controller, the DDR data crossing unit 4022 in the DDR crossing module obtains a first stored target module identifier from a module identifier cache queue FIFO2 corresponding to the DDR controller, and then adds the table entry to a table entry cache sub-queue that is in a table entry cache queue FIFO4 of an interface module corresponding to the target module identifier and that corresponds to the DDR controller.

For example, with reference to FIG. 8, after receiving a table entry sent by the DDR controller 0, the DDR data crossing unit 4022 obtains a first stored module identifier, namely, a module identifier 1 from the FIFO2_0, and adds the table entry to the FIFO40_1.

After adding a received table entry to a corresponding table entry cache sub-queue, according to an order in which DDR controller identifiers in a controller identifier cache queue FIFO1 corresponding to each interface module are added, the DDR data crossing unit 4022 sends, to a corresponding interface module, a table entry in a table entry cache sub-queue that is in each table entry storage queue FIFO4 of each interface module and that corresponds to each DDR controller.

Specifically, the DDR data crossing unit 4022 obtains a first stored controller identifier from a controller identifier cache queue corresponding to each interface module, and then sends, to a corresponding interface module, a table entry stored in a table entry cache sub-queue that is in each table entry cache queue FIFO4 of each interface module and that corresponds to the first stored controller identifier.

For example, with reference to FIG. 8, the first stored controller identifier obtained by the DDR data crossing unit 4022 from the FIFO1_0 is a controller identifier 1, and then a first stored table entry in the FIFO40_1 is output to the interface module 0.

In an embodiment, after a table entry is added to a table entry cache sub-queue that is in a table entry cache queue of an interface module corresponding to a target module identifier and that corresponds to any DDR, the target module identifier is deleted from a module identifier cache queue corresponding to the any DDR controller; and after a table entry in a table entry cache sub-queue that is in each table entry cache queue of each interface module and that corresponds to each DDR controller is sent to a corresponding interface module, a first stored controller identifier is deleted from a controller identifier cache queue corresponding to each interface module.

For example, with reference to FIG. 8, the DDR data crossing unit 4022 obtains a first stored interface module identifier, namely, a module identifier 1, from a FIFO2_0, adds the table entry to a FIFO41_0, and then deletes the module identifier 1 from the FIFO2_0; and the DDR data crossing unit 4022 obtains a first stored controller identifier, namely, a controller identifier 0, from a FIFO1_1, outputs a first stored table entry in the FIFO41_0 to the interface module 1, and then deletes the controller identifier 0 from the FIFO1_1.

In the foregoing embodiment, it can be ensured that a table entry can be output in an ordered manner next time, to improve accuracy of table entry reading.

In the table entry reading method provided in the embodiments of this application, the DDR crossing module is used to select a DDR controller from at least two DDR controllers as a target DDR controller. Compared with a mode in the conventional technology in which an interface module and a DDR controller are in a one-to-one correspondence, this is more flexible, and can improve reliability of table entry reading and dynamically balance and share bandwidth between DDR interfaces.

Based on a same inventive concept, an embodiment of this application further provides a table entry reading apparatus, applied to a table entry reading device of a network device, where the table entry reading device includes a crossing module, at least two interface modules, at least two controllers, and a memory corresponding to each controller, and the table entry reading apparatus includes a command crossing unit and a data crossing unit.

The command crossing unit is configured to: after a read command sent by any one of the at least two interface modules is received, determine a target controller according to a preset polling rule and based on state information of a command cache sub-queue that is in a command cache queue of each controller and that corresponds to the any interface module, add a controller identifier for the target controller to a controller identifier cache queue corresponding to the any interface module, and add the read command to a command cache sub-queue that is in a command cache queue of the target controller and that corresponds to the any interface module; and send, to a corresponding controller according to a load balancing principle, a read command in each command cache sub-queue included in each command cache queue of each controller, and add a module identifier for an interface module corresponding to a command cache sub-queue in which the sent read command is located to a module identifier cache queue of a controller corresponding to the sent read command, so that each controller obtains, from a corresponding memory, a table entry corresponding to the received read command.

The data crossing unit is configured to: after a table entry returned by any one of the at least two controllers is received, first obtain a previously stored target module identifier from a module identifier cache queue corresponding to the any controller, and add the received table entry to a table entry cache sub-queue that is in a table entry cache queue of an interface module corresponding to the target module identifier and that corresponds to the any controller; and according to an order in which controller identifiers in a controller identifier cache queue corresponding to each interface module are added, send, to a corresponding interface module, a table entry in a table entry cache sub-queue that is in each table entry cache queue of each interface module and that corresponds to each controller.

Optionally, the command crossing unit is specifically configured to:

- determine a candidate controller after a last determined target controller according to the preset polling rule;
- determine state information of a command cache sub-queue that is in a command cache queue of the candidate controller and that corresponds to the any interface module; and
- if it is determined that the state information of the command cache sub-queue corresponding to the any interface module is a busy state, update the candidate controller to a controller after the candidate controller, and perform the step of determining state information of a command cache sub-queue that is in a command cache queue of the candidate controller and that corresponds to the any interface module; or
- if it is determined that the state information of the command cache sub-queue corresponding to the any interface module is a non-busy state, determine the candidate controller as a target controller of this time.

Optionally, the command crossing unit is specifically configured to:

- obtain a first quantity of read commands stored in the command cache sub-queue that is in the command cache queue of the candidate controller and that corresponds to the any interface module;
- determine whether the first quantity is less than a first specified threshold; and
- if it is determined that the first quantity is less than the first specified threshold, determine that the state information of the command cache sub-queue corresponding to the any interface module is a non-busy state; or
- if it is determined that the first quantity is not less than the first specified threshold, determine that the state information of the command cache sub-queue corresponding to the any interface module is a busy state.

Optionally, before the determining the candidate controller as a target controller of this time, the command crossing unit is further configured to:

- determine state information of the candidate controller; and
- if it is determined that the state information of the candidate controller is abnormal, update the candidate controller to a controller after the candidate controller, and perform the step of determining state information of the candidate controller; or
- if it is determined that the state information of the candidate controller is normal, perform the step of determining the candidate controller as a target controller of this time.

Optionally, the command crossing unit is specifically configured to:

- obtain error information that is obtained by verifying an obtained table entry and that is sent by the candidate controller;
- determine whether a second quantity of the obtained error information is greater than a second specified threshold; and
- if it is determined that the second quantity is greater than the second specified threshold, determine that the state information of the candidate controller is abnormal; or
- if it is determined that the second quantity is not greater than the second specified threshold, determine that the state information of the candidate controller is normal.

Optionally, the data crossing unit is specifically configured to:

- first obtain a previously stored controller identifier from a controller identifier cache queue corresponding to each interface module; and
- first send, to a corresponding interface module, a table entry stored in a table entry cache sub-queue that is in each table entry cache queue of each interface module and that corresponds to the previously stored controller identifier.

Optionally, after the adding the received table entry to a table entry cache sub-queue that is in a table entry cache queue of an interface module corresponding to the target module identifier and that corresponds to the any controller, the data crossing unit is further configured to:

delete the target module identifier from the module identifier cache queue corresponding to the any controller; and after the sending, to a corresponding interface module, a table entry in a table entry cache sub-queue that is in each table entry cache queue of each interface module and that corresponds to each controller, the crossing module is further configured to:

first delete a previously stored controller identifier from a controller identifier cache queue corresponding to each interface module.

Based on a same inventive concept, an embodiment of this application further provides a network device, including a table entry reading device, where the table entry reading device includes at least two interface modules, at least two controllers, a memory corresponding to each controller, and the table entry reading apparatus according to any one of the foregoing implementations.

It should be noted that, although the DDR is used as an example for description in the embodiments of this application, application scenarios of this application are not limited to the DDR, and this application is also applicable to different storage media such as a RAM for multi-port access, a flash memory (FLASH), and a high bandwidth memory (English: High Bandwidth Memory, HBM for short).

Further, an embodiment of this application further provides a computer-readable storage medium, where the computer-readable storage medium stores computer instructions, and when the computer instructions run on a computer, the computer is enabled to perform the steps of any one of the foregoing methods.

Persons of ordinary skill in the art can understand that all or some of the steps of the method embodiments may be implemented by a program instructing related hardware. The program may be stored in a computer-readable storage medium. When the program is executed, the steps of the method embodiments are performed. The storage medium includes any medium that can store program code, for example, a ROM, a RAM, a magnetic disk, or an optical disc.

Although the foregoing describes specific embodiments of this application, persons skilled in the art should understand that these embodiments are merely examples, and the protection scope of this application is limited by the appended claims. Persons skilled in the art may make various changes or modifications to these embodiments without departing from the principle and the essence of this application, and these changes and modifications fall within the protection scope of this application. Although example embodiments of this application have been described, persons skilled in the art can make additional changes and modifications to these embodiments once they learn the basic inventive concept. Therefore, the appended claims are intended to be construed as including the example embodiments and all changes and modifications that fall within the scope of this application.

Clearly, persons skilled in the art can make various modifications and variations to this application without departing from the scope of this application. This application is intended to cover these modifications and variations of this application provided that they fall within the scope of the claims of this application and equivalent technologies thereof.

What is claimed is:

1. A table entry reading method, wherein the table entry reading method is applied to a table entry reading device, and the table entry reading device comprises a crossing module, a plurality of interface modules communicatively connected to the crossing module, a plurality of controllers communicatively connected to the crossing module, and a plurality of memories respectively corresponding to the plurality of controllers; wherein the plurality of interface modules comprise a first interface module, the plurality of controllers comprise a first controller, the plurality of memories comprise a first memory, and the first controller corresponds to the first memory; and the method comprises:

receiving, by the crossing module, a first read command from the first interface module;

determining, by the crossing module, the first controller from the plurality of controllers as a target controller by polling according to a preset polling rule, and determining a correspondence between the first interface module and the first controller;

sending, by the crossing module, the first read command to the first controller based on a controller identifier for the first controller corresponding to the first interface module in the correspondence between the first interface module and the first controller, so that the first controller obtains, from the corresponding first memory, a first table entry corresponding to the first read command; and receiving, by the crossing module, the first table entry from the first controller, and sending the first table entry to the first interface module based on a module identifier for the first interface module corresponding to the first controller in the correspondence between the first interface module and the first controller.

2. The method according to claim 1, wherein the determining the correspondence between the first interface module and the first controller comprises:

adding the controller identifier for the first controller to a controller cache queue corresponding to the first interface module; and adding the module identifier for the first interface module to a module identifier cache queue corresponding to the first controller.

3. The method according to claim 1, wherein before the sending the first read command to the first controller, the method further comprises:

adding the first read command to a command cache queue corresponding to the first controller.

4. The method according to claim 1, wherein the plurality of interface modules further comprise a second interface module, and the method further comprises:

receiving a second read command from the second interface module;

determining the first controller from the plurality of controllers as a target controller, and determining a correspondence between the second interface module and the first controller; and adding the second read command to the command cache queue corresponding to the first controller.

5. The method according to claim 4, wherein the command cache queue corresponding to the first controller comprises a plurality of command cache sub-queues respectively corresponding to the plurality of interface modules, the first interface module corresponds to a first command cache sub-queue, and the second interface module corresponds to a second command cache sub-queue; and the adding the second read command to the command cache queue corresponding to the first controller comprises:

adding the second read command to the second command cache sub-queue; and sending, to the first controller according to a load balancing principle, a read command in the plurality of command cache sub-queues of the command cache queue corresponding to the first controller.

6. The method according to claim 1, wherein the plurality of controllers further comprise a second controller, and the plurality of memories further comprise a second memory corresponding to the second controller; and the method further comprises:

receiving a third read command from the first interface module;

determining the second controller from the plurality of controllers as a target controller by polling according to the preset polling rule, and determining a correspondence between the first interface module and the second controller;

sending the third read command to the second controller, so that the second controller obtains, from the corresponding second memory, a third table entry corresponding to the third read command; and receiving the third table entry from the second controller, and adding the third table entry to a table entry storage queue.

7. The method according to claim 6, wherein the table entry storage queue comprises a first table entry storage sub-queue and a second table entry storage sub-queue, the first table entry storage sub-queue corresponds to the first interface module, and the second table entry storage sub-queue corresponds to the second interface module;

the method further comprises:

adding the first table entry to the first table entry storage sub-queue; and the adding the third table entry to the table entry storage queue comprises:

adding the third table entry to the first table entry storage sub-queue.

8. The method according to claim 7, wherein the method further comprises:

sending a table entry stored in the first table entry storage sub-queue to the first interface module, wherein the crossing module is configured to send data in a first order, correspondences between the first interface module and controllers are determined in a second order, and the first order corresponds to the second order.

9. The method according to claim 1, wherein after the step of determining a correspondence between the first interface module and the first controller, the method further comprises:

recording the correspondence between the first interface module and the first controller; and wherein after the step of sending the first read command to the first controller, the method further comprises:

deleting the correspondence between the first interface module and the first controller.

10. The method according to claim 1, wherein the determining the first controller from the plurality of controllers as the target controller by polling according to the preset polling rule comprises:

determining the first controller as a candidate controller by polling according to the preset polling rule; and determining the first controller as the target controller when the first controller is in an available state.

11. The method according to claim 10, wherein the plurality of controllers further comprise a second controller, and the plurality of memories further comprise a second memory corresponding to the second controller, and the determining the first controller from the plurality of controllers as the target controller by polling according to the preset polling rule further comprises:

determining the second controller as a candidate controller by polling according to the preset polling rule; and determining the first controller as the candidate controller when the second controller is in an unavailable state.

12. The method according to claim 10, wherein the preset polling rule is:

determining, as a candidate controller, a controller after a target controller determined in previous polling.

13. The method according to claim 10, wherein after the step of determining the first controller from the plurality of controllers as the candidate controller, the method further comprises:

determining whether the first controller is in an abnormal state, wherein the determining step comprises:

obtaining a count value from the first controller, wherein the count value is a number of times the first controller obtaining error table entries;

determining whether the count value is greater than a second specified threshold; and when the count value is not greater than the second specified threshold, determining that the first controller is in a non-abnormal state and the state information of the first controller is available.

14. The method according to claim 13, wherein the determining whether the first controller is in an abnormal state comprises:

when the count value is greater than a second specified threshold, determining that the first controller is in an abnormal state and the state information of the first controller is unavailable.

15. The method according to claim 13, wherein the method further comprises:

determining whether the second table entry storage sub-queue is in a busy state; and when a first quantity of reading commands stored in the second table entry storage sub-queue is less than a first specified threshold, determining that the second table entry storage sub-queue is in a non-busy state and the state information of the first controller is an available state.

16. The method according to claim 15, wherein after the determining whether the second table entry storage sub-queue is in the busy state, the method further comprises:

when the first quantity is not less than the first specified threshold, determining that the state of the first controller is the busy state and the state information of the first controller is an unavailable state.

17. A table entry reading device, wherein the table entry reading device comprises a crossing module, a plurality of interface modules communicatively connected to the crossing module, a plurality of controllers communicatively connected to the crossing module, and a plurality of memories respectively corresponding to the plurality of controllers; wherein the plurality of interface modules comprise a first interface module, the plurality of controllers comprise a first controller, the plurality of memories comprise a first memory, and the first controller corresponds to the first memory; and the table entry reading device comprises a memory and a processor;

the memory is configured to store program code used during operation of an electronic device; and the processor is configured to execute:

receiving, by the crossing module, a first read command sent by the first interface module;

determining, by the crossing module, the first controller from the plurality of controllers as a target controller by polling according to a preset polling rule, and determining a correspondence between the first interface module and the first controller;

sending, by the crossing module, the first read command to the first controller based on a controller identifier for the first controller corresponding to the first interface module in the correspondence between the first interface module and the first controller, so that the first controller obtains, from the corresponding first memory, a first table entry corresponding to the first read command; and receiving, by the crossing module, the first table entry returned by the first controller, and sending the first table entry to the first interface module based on a module identifier for the first interface module corresponding to the first controller in the correspondence between the first interface module and the first controller.

18. A non-transitory computer-readable storage medium, wherein when instructions in the storage medium are executed by a processor of an electronic device, the electronic device is enabled to perform:

receiving, by a crossing module of the electronic device, a first read command sent by a first interface module;

determining, by the crossing module, a first controller from a plurality of controllers as a target controller by polling according to a preset polling rule, and determining a correspondence between the first interface module and the first controller;

sending, by the crossing module, the first read command to the first controller based on a controller identifier for the first controller corresponding to the first interface module in the correspondence between the first interface module and the first controller, so that the first controller obtains, from the corresponding first memory, a first table entry corresponding to the first read command; and receiving, by the crossing module, the first table entry returned by the first controller, and sending the first table entry to the first interface module based on a module identifier for the first interface module corresponding to the first controller in the correspondence between the first interface module and the first controller.

19. The method according to claim 1, wherein the plurality of controllers comprise a second controller, the plurality of memories comprise a second memory connected to the second controller, and table entries stored in the first memory are identical to table entries stored in the second memory.

* * * * *